United States Patent
Usami et al.

(10) Patent No.: US 11,556,287 B2
(45) Date of Patent: Jan. 17, 2023

(54) PRINTING DEVICE HOLDING PRINT JOB WITHOUT LIMITING LEVEL OF ELECTRIC POWER BEING SUPPLIED TO EXTERNAL DEVICE

(71) Applicant: BROTHER KOGYO KABUSHIKI KAISHA, Nagoya (JP)

(72) Inventors: Hajime Usami, Nagoya (JP); Yasuhiro Shimamura, Nagoya (JP); Seigo Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/498,833

(22) Filed: Oct. 12, 2021

(65) Prior Publication Data

US 2022/0137892 A1    May 5, 2022

(30) Foreign Application Priority Data

Oct. 29, 2020    (JP) .............................. JP2020-181600

(51) Int. Cl.
*G06F 3/12*    (2006.01)
(52) U.S. Cl.
CPC .......... *G06F 3/1221* (2013.01); *G06F 3/1263* (2013.01); *G06F 3/1267* (2013.01)
(58) Field of Classification Search
CPC ..... G06F 3/1221; G06F 3/1263; G06F 3/1267
USPC ....................................................... 358/1.13
See application file for complete search history.

(56) References Cited

U.S. PATENT DOCUMENTS

| | | | |
|---|---|---|---|
| 2005/0200703 A1* | 9/2005 | Kobayashi | H04N 1/00408 348/207.2 |
| 2014/0240736 A1* | 8/2014 | Tsongas | G06F 3/1267 358/1.13 |
| 2015/0264208 A1 | 9/2015 | Achiwa et al. | |
| 2018/0285038 A1* | 10/2018 | Shimamura | G06F 1/329 |

FOREIGN PATENT DOCUMENTS

JP    2015-176442 A    10/2015

* cited by examiner

*Primary Examiner* — Allen H Nguyen
(74) *Attorney, Agent, or Firm* — Scully, Scott, Murphy & Presser, PC

(57) ABSTRACT

The printing device includes a printing unit, an interface, and a controller. In a case that a print job is received while electric power is being supplied to an external device from the interface, the controller determines whether a first condition or a second condition is met. The print job is for commanding the printing unit to execute printing. The second condition is different from the first condition. The controller executes printing based on the print job while limiting a level of the electric power being supplied to the external device from the interface in a case that the controller determines that the first condition is met. The controller holds the print job without limiting a level of the electric power supplied to the external device from the interface in a case that the controller determines that the second condition is met.

20 Claims, 5 Drawing Sheets

PRINTING DEVICE HOLDING PRINT JOB WITHOUT LIMITING LEVEL OF ELECTRIC POWER BEING SUPPLIED TO EXTERNAL DEVICE

CROSS REFERENCE TO RELATED APPLICATION

This application claims priority from Japanese Patent Application No. 2020-181600 filed Oct. 29, 2020. The entire content of the priority application is incorporated herein by reference.

TECHNICAL FIELD

The present disclosure relates to a printing device that supplies power to an external device, a method of controlling the printing device, and a program.

BACKGROUND

Various printing devices that supply power to an external device via an interface have been proposed. For example, one conventional printing device supplies power to an external device through a USB interface conforming to the USB Power Delivery (USB PD) specification. In a case that the printing device receives a print command while supplying power to an external device, the printing device first reduces power supplied to the external device before executing a print based on the received print command.

SUMMARY

Here, the conventional printing device described above reduces the amount of power being supplied to the external device on the condition that a print command was received from an external device. Consequently, there is risk that the external device receiving power could suffer a power shortage when the supplied power is reduced. The external device is particularly likely to suffer a power shortage when the supplied power is reduced each time the printing device receives a print command, regardless of the type of print command.

In view of the foregoing, it is an object of the present disclosure to provide a printing device, a method of controlling the printing device, and a program capable of suppressing the occurrence of power shortages in an external device to which power is being supplied.

In order to attain the above and other objects, the disclosure provides a printing device. The printing device includes a printing unit, an interface, and a controller. The printing unit is configured to perform printing. The controller is configured to perform: in a case that a print job is received while electric power is being supplied to an external device from the interface, determining whether a first condition or a second condition is met, the print job being for commanding the printing unit to execute printing, the second condition being different from the first condition; executing printing based on the print job while limiting a level of the electric power being supplied to the external device from the interface in a case that the controller determines that the first condition is met; and holding the print job without limiting a level of the electric power supplied to the external device from the interface in a case that the controller determines that the second condition is met.

According to another aspect, the disclosure provides a method for controlling a printing device. The printing device includes: a printing unit configured to perform printing; an interface; and a controller. The method includes: in a case that a print job is received while electric power is being supplied to an external device from the interface, determining whether a first condition or a second condition is met, the print job being for commanding the printing unit to execute printing, the second condition being different from the first condition; executing printing based on the print job while limiting a level of the electric power being supplied to the external device from the interface in a case that it is determined that the first condition is met; and holding the print job without limiting a level of the electric power supplied to the external device from the interface in a case that it is determined that the second condition is met.

According to still another aspect, the disclosure provides a non-transitory computer readable storage medium storing a set of program instructions installed on and executed by a computer for controlling a printing device including: a printing unit configured to perform printing; and an interface. The set of program instructions includes: in a case that a print job is received while electric power is being supplied to an external device from the interface, determining whether a first condition or a second condition is met, the print job being for commanding the printing unit to execute printing, the second condition being different from the first condition; executing printing based on the print job while limiting a level of the electric power being supplied to the external device from the interface in a case that it is determined that the first condition is met; and holding the print job without limiting a level of the electric power supplied to the external device from the interface in a case that it is determined that the second condition is met.

BRIEF DESCRIPTION OF THE DRAWINGS

The particular features and advantages of the disclosure as well as other objects will become apparent from the following description taken in connection with the accompanying drawings, in which.

DETAILED DESCRIPTION

A portable printer 1 shown in FIG. 1 according to an embodiment of the printing device will be described.

1. Structure of a Portable Printer

Figure 1:
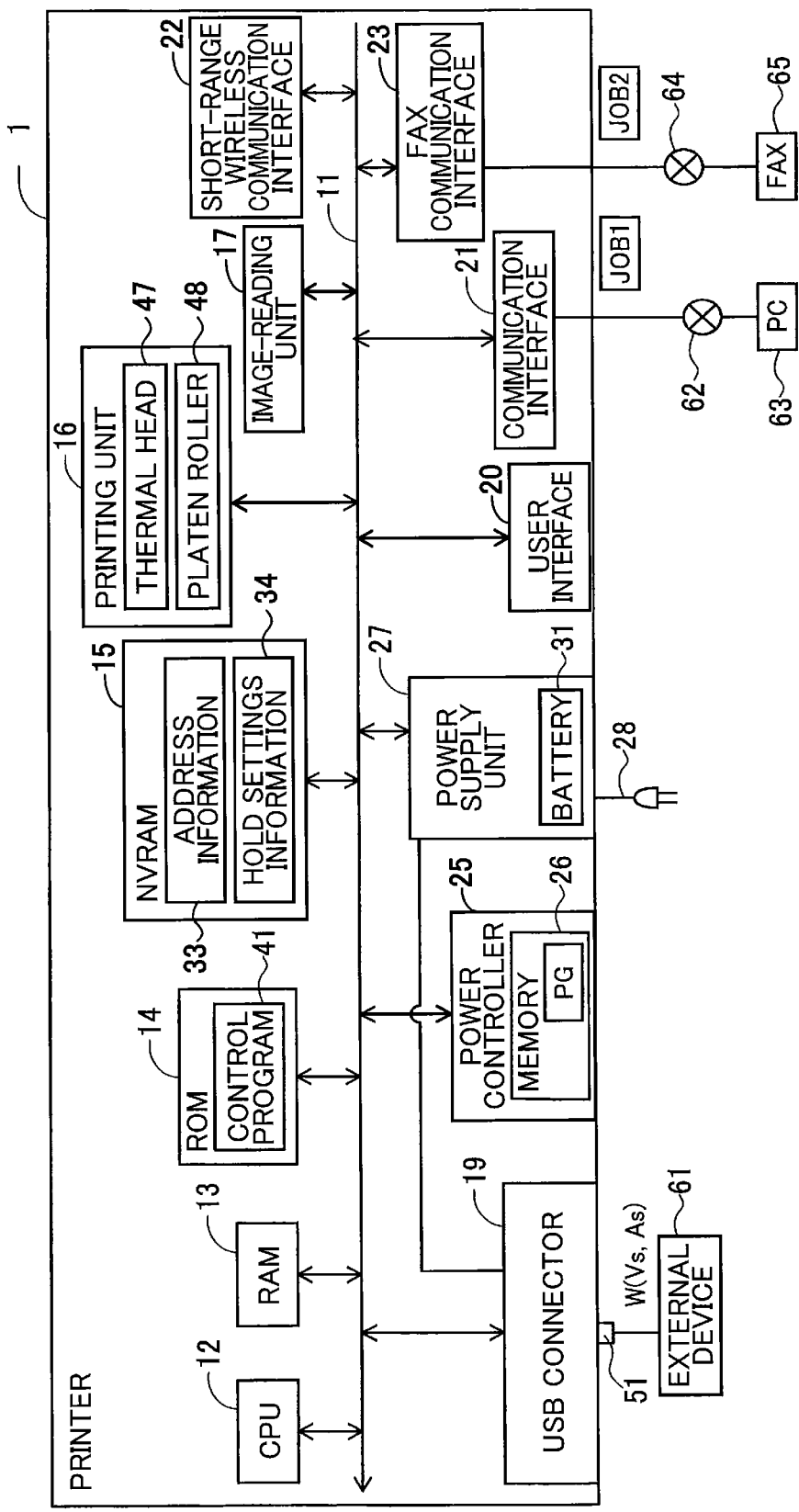
FIG. 1 is a block diagram illustrating an electrical structure of a printer according to an embodiment.

FIG. 1 shows the electrical structure of the portable printer 1 according to the embodiment. The printer 1 may be a portable printing device that receives a print job through wired or wireless communications with a personal computer (PC), smartphone, or the like and prints image data in the print job on a prescribed sheet (thermal paper, etc.), for example. The printer 1 is provided with a CPU 12, a RAM 13, a ROM 14, a NVRAM 15, a printing unit 16, an image-reading unit 17, a Universal Serial Bus (USB) connector 19, a user interface 20, a communication interface 21, a short-range wireless communication interface 22, a fax communication interface 23, a power controller 25, a power supply unit 27, and the like. These components are all interconnected and capable of communicating with each other via a bus 11.

The ROM 14 is nonvolatile memory such as flash memory. The ROM 14 stores various programs including a control program 41. The CPU 12 starts up the system on the printer 1 by reading the control program 41 from the ROM 14 and executing the control program 41. The control program 41 is an example of the program. Note that the ROM 14 is merely one example of the storage location for the control program 41. As an alternative, the control program 41 may be stored in the NVRAM 15 or on a hard disk, for example. The control program 41 should be stored in a computer-readable storage medium. In addition to the above examples, computer-readable storage media include CD-ROM and DVD-ROM.

The control program 41 is firmware for controlling all components of the printer 1, for example. By executing the control program 41, the CPU 12 controls the components that are interconnected via the bus 11 while temporarily storing process results in the RAM 13. In the following description, the action of the CPU 12 executing the control program 41 may simply be described as the CPU 12. For example, the description "the CPU 12" may be used to signify "the CPU 12 executing the control program 41."

The NVRAM 15 is a nonvolatile memory. The NVRAM 15 stores various information on settings and the like for the printer 1. The NVRAM 15 according to the embodiment stores address information 33, and hold settings information 34. The address information 33 is information specifying fax transmission destinations by correlating information such as a registration number, a contact name, and a telephone number. The user can edit the address information 33 through operations on the user interface 20, for example. The hold settings information 34 is settings information on delaying printing. The hold settings information 34 will be described later in greater detail. As will be described later, the printer 1 also stores in the NVRAM 15 data for print jobs received with a print command when delaying the execution of printing.

The printing unit 16 is provided with a line-type thermal head 47, for example. The printing unit 16 uses a direct thermal printing method to print images on sheets under control of the CPU 12. The printing unit 16 conveys a sheet by rotating a platen roller 48 disposed in opposition to the thermal head 47. For example, a sheet is inserted through an insertion hole in the printer 1 to begin printing. The inserted sheet is guided through the region in which the platen roller 48 and the thermal head 47 confront each other and is discharged through a discharge opening after printing is complete.

The above configuration of the printing unit 16 is merely one example. Rather than a direct thermal printing method, the printing unit 16 may employ an electrophotographic printing method or an inkjet printing method. When printing according to an electrophotographic method, the printing unit 16 is provided with a toner cartridge, a photosensitive drum, a developing roller, an exposure device, and the like. When printing according to an inkjet method, the printing unit 16 is provided with an inkjet head, an ink cartridge, and the like.

Although not shown in the drawings, the image-reading unit 17 is provided with an original platen, and an image sensor such as a contact image sensor (CIS) or a charge-coupled device (CCD). The image-reading unit 17 reads an original placed on the original platen by moving the CIS or the like relative to the original, generates image data, and stores this image data in the RAM 13.

The USB connector 19 is an interface that conducts communication and power delivery and acceptance in conformance with the USB PD specification, for example. The USB connector 19 is provided with a receptacle 51 as the connector. The USB connector 19 conducts data communication and power delivery and acceptance with any of various external devices 61 connected to the receptacle 51. In the example of FIG. 1, a single external device 61 is connected to the receptacle 51. Any of various devices that can connect and communicate according to the USB standard may be employed as an external device, such as a smartphone, a personal computer (PC), a laptop computer, a printer, an external hard disk, a USB flash drive, a card reader, and the like. The USB connector 19 may be provided with a plurality of receptacles 51.

The receptacle 51 is a connector conforming to the USB Type-C specification, for example. The receptacle 51 is provided with a plurality of signal lines for implementing data communication and power delivery and acceptance. The plurality of lines possessed by the receptacle 51 include TX lines, RX lines, D lines, Vbus lines, CC lines, and GND lines of a USB Type-C connector, for example. The lines are also referred to as "pins." The receptacle 51 conducts data communication using any of the TX, RX, and D lines, for example. The D lines are data lines designated as D+/D−, for example. The receptacle 51 also supplies or receives power using the Vbus lines.

The CC lines are used to determine the power role, for example. The receptacle 51 has a CC1 line and a CC2 line that respectively correspond to opposite sides of the connected plug. The CC lines may also be used for device-management-related communication, such as alerts and messages. The receptacle 51 has a dual-role power (DRP) function so that the function of the receptacle 51 can be switched between a source whose role is to supply power, and a sink whose role is to receive power.

The power controller 25 controls power delivery and acceptance and data transmission/reception through the USB connector 19. For example, the power controller 25 sets the power role based on the connected status of the CC lines (electric potential of the CC lines, etc.) when the external device 61 is connected to the receptacle 51 and performs power delivery or acceptance negotiation. The term "negotiation" used in this specification is defined as a process for setting the source and sink, setting the level of the power being delivered or accepted, and the like.

For example, the power controller 25 negotiates such settings as a power level (an amount of power) W to be supplied over the Vbus line with the receptacle 51 functioning as the power source. Here, the power controller 25 transmits a list of power levels W to the external device 61 under control of the CPU 12, for example. The list of power levels in this description denotes information specifying the possible combinations of values for supply voltages Vs and supply currents As that the printer 1 can deliver as a power source. This list is also called a "profile," while each combination of a voltage value and a current value may be called a "power data object" (PDO). In the example of the embodiment, power delivery over the USB connector 19 from the source to the sink has a range of possible levels from 10 W (5V, 2 A) to 100 W (20V, 5 A). Thus, information in the power list specifying combinations of voltage values and current values (PDOs) that the printer 1 can deliver as the source fall within this range of power levels.

The power controller 25 receives a response from the external device 61, which functions as the sink, indicating a desired combination in the list received from the power controller 25. In other words, the external device 61 indicates the desired combination of a voltage value and a current value to draw from the power supply unit 27. When the power level W corresponding to the requested supply voltage Vs and supply current As can be supplied, the power controller 25 begins supplying the power level W to the external device 61.

As shown in FIG. 1, the power controller 25 is also provided with a memory 26. The memory 26 stores a program PG. The power controller 25 has a processing circuit such as a CPU and can control the power supply unit 27 and the like by executing the program PG through the process circuit. The memory 26 is configured of a combination of memory types such as RAM, ROM, and flash memory.

The power supply unit 27 functions as a power supply for supplying power to each device in the printer 1. The power supply unit 27 is provided with a power cord 28, a battery 31, and the like. The power supply unit 27 generates DC voltage of a desired value from AC voltage drawn through the power cord 28 from an AC power supply, and supplies this DC voltage to devices in the printer 1. The power supply unit 27 also generates DC voltage to be supplied to devices in the printer 1 by transforming the DC voltage supplied from the battery 31. Therefore, the printer 1 can be powered by the battery 31 when not connected to an AC power supply. The power supply unit 27 can also charge the battery 31 using power supplied via the power cord 28 or power drawn from the external device 61 through the USB connector 19. The power supply unit 27 also need not be provided with the battery 31.

The power supply unit 27 is also connected to the USB connector 19. The power supply unit 27 generates power at the power level W (the supply voltage Vs and the supply current As) from AC voltage received over the power cord 28 or DC voltage supplied from the battery 31, and supplies the external device 61 with this generated power from the USB connector 19.

The user interface 20 is a touchscreen, for example. The user interface 20 is provided with a liquid crystal panel, a light source, such as an LED, that irradiates light from the back side of the liquid crystal panel, a touch-sensitive film attached to the front surface of the liquid crystal panel, and the like. The user interface 20 receives input operations for the printer 1 and outputs signals corresponding to the inputted operations to the CPU 12. The user interface 20 also displays information related to the printer 1. The user interface 20 changes the displayed content on the liquid crystal panel under control of the CPU 12. Note that the user interface 20 may also be provided with hard keys or other operating buttons. Further, the user interface 20 is not limited to a construction that integrates the display with the operating interface, such as a touchscreen, but may configured such that the display and operating interface are provided separately.

The communication interface 21 is a device capable of performing wired or wireless communications. For example, the communication interface 21 connects to a PC 63 via a wired network 62 configured of a LAN capable, a router, and the like. The CPU 12 receives an image-formation job JOB1 from the PC 63 via the communication interface 21. The image-formation job JOB1 includes image data and information instructing a print based on this image data, for example. The CPU 12 executes a print using the printing unit 16 based on the image data received with the image-formation job JOB1. The CPU 12 can also receive other jobs over the communication interface 21, such as scan jobs. In the following description, command information for the printer 1 such as the image-formation job JOB1 or a scan job may simply be called a "job." Jobs that include a command for printing may be called "print jobs." The image-formation job JOB1 is one type of print jobs received via the communication interface 21. The communication interface 21 is not limited to wired communications as the method of communicating but may employ wireless communications, such as Wi-Fi (registered trademark). Further, jobs such as image-formation jobs JOB1 may be transmitted to the printer 1 over the communication interface 21 from devices other than the PC 63, such as a smartphone or a server device. Further, the communication interface 21 may be connected to a network other than a local area network, such as the Internet or other wide area network. Therefore, the printer 1 may receive jobs via the Internet.

The short-range wireless communication interface 22 performs wireless communication with another wireless communication device located in proximity to the printer 1 according to a prescribed short-range wireless communication method. The communication standard of the prescribed short-range wireless communication method has no particular limitations but may be one of the Near Field Communication (NFC) or Bluetooth (registered trademark) communication standard. The CPU 12 can receive jobs from a PC, tablet computer, smartphone, or the like via the short-range wireless communication interface 22, for example.

The fax communication interface 23 can communicate with a facsimile machine 65 over a telephone line 64. When connected to a telephone exchange via the telephone line 64, the fax communication interface 23 can receive a fax job JOB2 from the facsimile machine 65 of another party and can transmit a fax job JOB2 to the facsimile machine 65. The fax job JOB2 is information including fax data (image data) and commanding the other device to print the fax data or the like, for example. The fax communication interface 23 receives the fax job JOB2 from the facsimile machine 65 under control of the CPU 12. The CPU 12 prints the fax data included in the fax job JOB2 using the printing unit 16. The fax job JOB2 is one type of print jobs received via the fax communication interface 23.

The CPU 12 accepts jobs for executing fax transmissions, copies, scans, and the like through operations inputted on the user interface 20. When the CPU 12 receives a command to transmit a fax job JOB2 to the facsimile machine 65 through an input operation on the user interface 20, for example, the CPU 12 transmits the fax job JOB2 that includes image data read by the image-reading unit 17 to the facsimile machine 65 as fax data.

2. Print Hold Function

The printer 1 according to the embodiment has a print hold function for delaying execution of printing while power is being supplied from the USB connector 19 (hereinafter called a "power supply state"). When the printer 1 receives a print job, the printer 1 determines whether to delay printing based on that print job. The following description includes cases for holding a print job, holding an image-formation job JOB1, and holding a fax job JOB2. The printer 1 can process jobs received in various formats as print jobs when the jobs command a print. For example, the printer 1 can receive, as a print job, an image-formation job JOB1 from the PC 63 via the communication interface 21 or a fax job JOB2 from the facsimile machine 65 via the fax communication interface 23.

In addition to the image-formation job JOB1 and the fax job JOB2 described above, the printer 1 can also receive print jobs from a PC or the like connected to the USB connector 19, for example. Alternatively, the printer 1 can receive a print job from a tablet computer or the like through wireless communication with the short-range wireless communication interface 22, for example. The fax job JOB2 received by the printer 1 may also be in an e-mail format such as an Internet fax (iFax).

Figure 2:
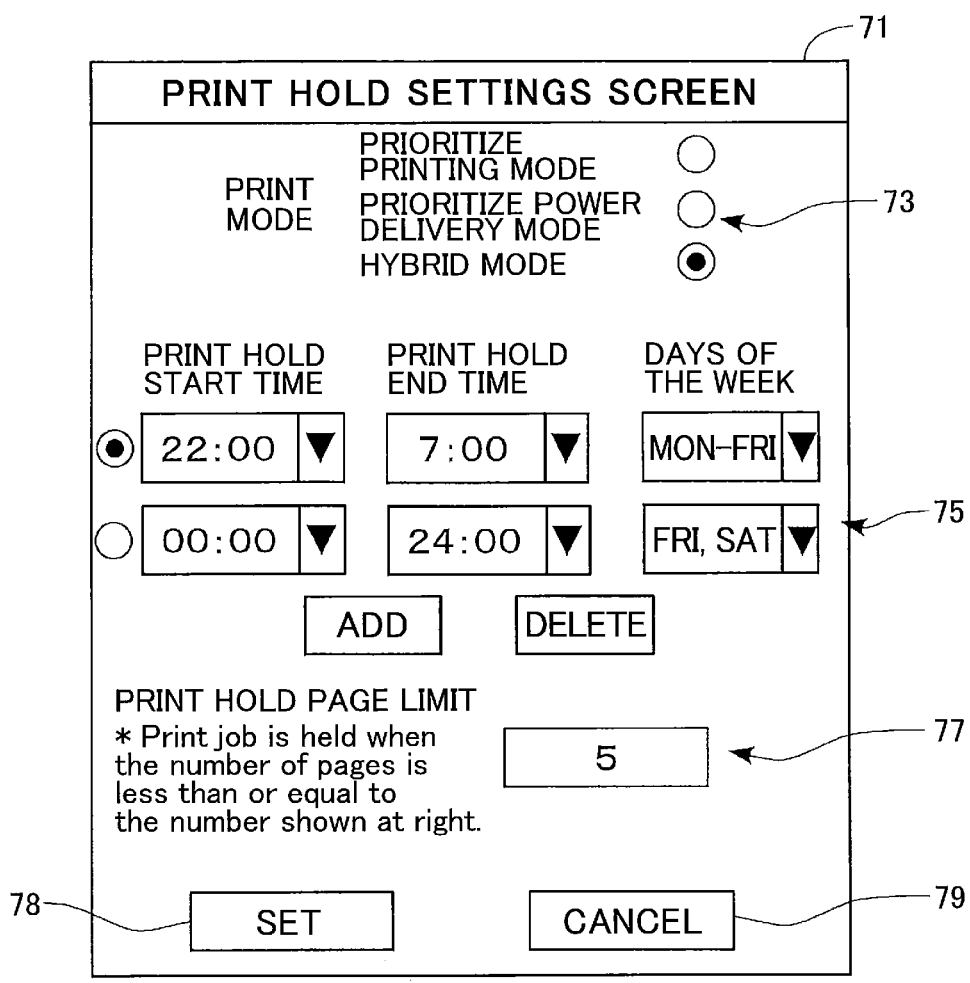
FIG. 2 is an explanatory diagram illustrating a print hold settings screen displayed on a user interface.

By executing the control program 41, the CPU 12 of the printer 1 receives settings for the print hold function through the user interface 20, for example. When the CPU 12 receives input of a prescribed operation on the user interface 20, the CPU 12 displays a print hold settings screen 71 on the user interface 20. As shown in FIG. 2, the CPU 12 displays a print mode selection section 73, a print hold schedule section 75, a print hold page limit section 77, a Set button 78, and a Cancel button 79 in the print hold settings screen 71. When displaying the print hold settings screen 71, the CPU 12 reads the hold settings information 34 from the NVRAM 15 and reflects the current settings in the print mode selection section 73 and the like.

The print mode selection section 73 receives a setting for the print mode. In this example, the printer 1 has three print modes: a prioritize printing mode, a prioritize power delivery mode, and a hybrid mode. The prioritize printing mode gives priority to printing. All print jobs received while the printer 1 is in the prioritize printing mode are printed without delay.

The prioritize power delivery mode gives priority to supplying power from the USB connector 19 to the external device 61. More specifically, when a print job is received while the printer 1 is in the prioritize power delivery mode, the printer 1 holds the print job in a case that the total amount of power required for printing based on the print job is greater than or equal to the power supply capacity. Here, the total amount of required power is the sum of the power to be consumed by the printer when executing the print job and the power level W being supplied to the external device 61. Hence, the total amount of required power is the total power required by the printer 1 to execute the print job while continuing to supply power to the external device 61. The CPU 12 may calculate the amount of power to be consumed by the printer 1 when executing the print job by totaling an amount of power that will be required for printing and an amount of power which is being supplied from the power supply unit 27 to each component in the printer 1 before printing. The CPU 12 can extract the amount of power required for printing from a table that correlates the number of pages and number of colors to be used in printing with power consumption.

The power supply capacity is the amount of power that can be supplied by the power supply unit 27, for example. In other words, the power supply capacity is the amount of power available in the printer 1. Accordingly, when the total amount of power exceeds the power supply capacity, the printer 1 has a power shortage. In the prioritize power delivery mode, when it is estimated that executing print jobs could result in a power shortage, the CPU 12 holds these print jobs to delay printing based on these print jobs. The CPU 12 can extract the power supply capacity of the power supply unit 27 from settings data stored in the ROM 14 in advance, for example.

In the hybrid mode, the printer 1 executes the process in FIG. 3 described later. In this process, when the printer 1 receives a print job while supplying power, the printer 1 determines whether to delay the execution of printing based on prescribed conditions. The CPU 12 receives a selection for one of the three modes through the radio buttons displayed in the print mode selection section 73 next to respective modes.

When the printer 1 is set to the hybrid mode, the print hold schedule section 75 receives settings for a time interval in which printing is to be delayed (hereinafter referred to as the "print hold interval"). For example, when the Add button is selected in the print hold schedule section 75, the CPU 12 displays pull-down menus for setting values for a print hold start time, a print hold end time, and days of the week. In the example shown in FIG. 2, conditions set in the top line indicate a print hold interval from 22:00 to 7:00, Monday through Friday. When the Delete button is selected in the print hold schedule section 75, the CPU 12 deletes the conditions for the print hold interval next to the selected radio button in the left side of the print hold schedule section 75.

The print hold page limit section 77 receives a setting for a print hold page limit used to determine whether to delay the execution of printing. Print jobs are held when their number of pages is no greater than the print hold page limit. In the example of FIG. 2, the print hold page limit has been set to 5 pages. When the Set button 78 is selected, the CPU 12 stores settings received through the print hold settings screen 71 described above in the hold settings information 34 of the NVRAM 15. Through this action, the CPU 12 incorporates the user settings specified in the print hold settings screen 71 for determining whether to hold print jobs. Further, when the Cancel button 79 is selected, the CPU 12 stops displaying the print hold settings screen 71 without storing any settings received through the print hold settings screen 71 in the hold settings information 34.

The items displayed in FIG. 2 and the method described above for receiving settings are merely one example. For example, the CPU 12 may accept numerical values for the print hold start time, the print hold end time, and the print hold page limit through a numeric keypad displayed on the touchscreen of the user interface 20. Further, the CPU 12 may receive only a print hold start time and a print hold end time and not a selection for days of the week and may apply the specified time period to all days of the week.

3. Print Hold Determination Process

Next, a print hold determination process executed by the printer 1 of the embodiment will be described with reference to FIG. 3. The CPU 12 of the printer 1 begins the print hold determination process shown in FIG. 3 when the printer 1 is set to the hybrid mode, for example. By executing the print hold determination process, the CPU 12 determines whether to hold print jobs received while the printer 1 is in the power supply state. By holding print jobs that meet prescribed conditions, the printer 1 can maintain the power level W being supplied to the external device 61.

Figure 3:
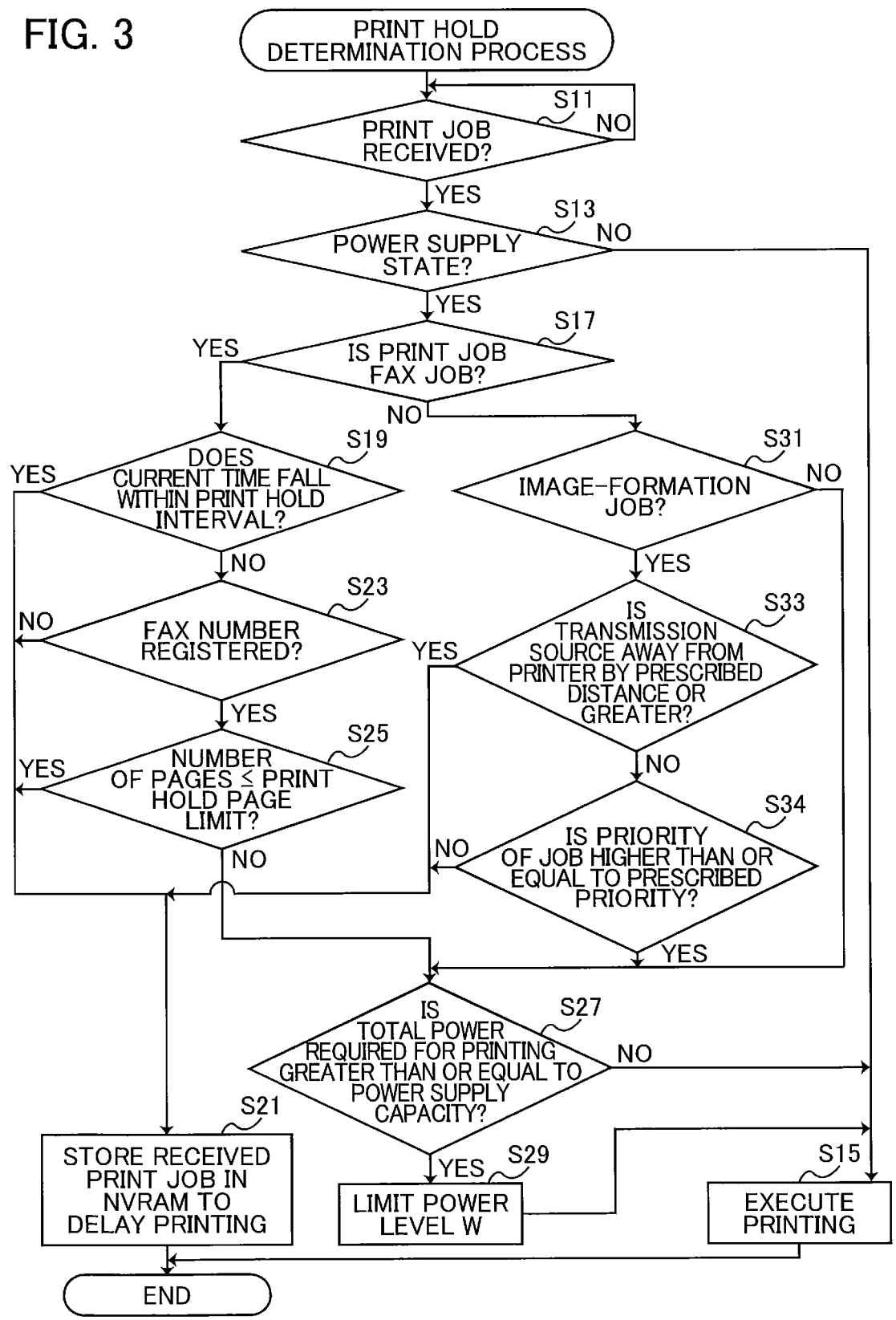
FIG. 3 is a flowchart illustrating a print hold determination process.

The condition for starting the print hold determination process in FIG. 3 is not limited to the operating mode of the printer 1 being set to the hybrid mode. For example, the printer 1 may begin the process in FIG. 3 on the condition that the USB connector 19 has begun supplying power after the printer 1 was set to the hybrid mode. That is, the CPU 12 may execute the process in FIG. 3 only while the printer 1 is in the hybrid mode and supplying power. In this case, when power delivery from the printer 1 is halted or when the printer 1 is only receiving power from the external device 61, the CPU 12 may execute print jobs received from an external device without holding the print jobs. The flowcharts in this specification essentially indicate processes performed by the CPU 12 according to instructions described in a program. Accordingly, processes such as "determine," "limit," and "execute" in the following description represent processes performed by the CPU 12. Processing by the CPU 12 includes hardware control. The processes shown in FIG. 3 may be executed by a device other than the CPU 12. For example, by executing the program PG, the power controller 25 may implement the processes shown in FIG. 3.

Further, steps shown in FIG. 3 will be abbreviated as "S" (e.g., step 11 will be referred to as "S11"). In S11 at the beginning of the process in FIG. 3, the CPU 12 determines whether a print job was received. While a print job has not been received (S11: NO), the CPU 12 repeatedly executes the determination in S11. Print jobs in this description include image-formation jobs JOB1 received by the communication interface 21, fax jobs JOB2 received by the fax communication interface 23, and print jobs received from a PC or the like connected to the USB connector 19 or the short-range wireless communication interface 22. When the CPU 12 receives a job other than a print job (a fax transmission job or a scan job, for example), the CPU 12 executes suitable image processing based on the corresponding job.

When the CPU 12 determines that a print job was received (S11: YES), in S13 the CPU 12 determines whether the printer 1 is in a power supply state in which power is being supplied from the USB connector 19 to the external device 61. In a case that power is not being supplied from the USB connector 19 to the external device 61 or the like (S13: NO), in S15 the CPU 12 executes a print using the printing unit 16 based on the print job received in S11. Accordingly, the CPU 12 executes print jobs received from a PC or the like when the printer 1 is in the hybrid mode as long as the printer 1 is not currently supplying power. After executing the print in S15, the CPU 12 ends the process of FIG. 3, and restarts the print hold determination process for repeatedly executing the process in S11 to accept a new print job.

However, in a case that the printer 1 is in a power supply state (S13: YES), in S17 the CPU 12 determines whether the print job received in S11 is a fax job JOB2. In a case that the print job is a fax job JOB2 (S17: YES), in S19 the CPU 12 determines whether the current time falls within the print hold interval. Specifically, the CPU 12 reads the hold settings information 34 from the NVRAM 15 and acquires settings from the hold settings information 34 indicating the print hold interval. When the current time falls within the time period indicated by the acquired settings (S19: YES), the CPU 12 advances to S21.

In S21 the CPU 12 stores data for the print job received in S11 (a fax job JOB2 in this case) in the NVRAM 15 for holding the print job and delaying printing based on the print job. After completing the process in S21, the CPU 12 ends the process of FIG. 3 and returns to S11. For example, if the print hold interval is a period late at night, there is little need to execute the print immediately since the user is not likely available to check the printed fax job JOB2. Therefore, by setting the print hold interval to a time period in which the user cannot promptly check content of a received fax job JOB2 and will not immediately use the printed matter, the printer 1 can avoid unnecessarily reducing the power level W to perform printing, as will be described later.

On the other hand, in a case that the current time is outside the print hold interval (S19: NO), in S23 the CPU 12 determines whether the fax number set as the transmission source in the fax job JOB2 received in S11 is registered in the address information 33. In a case that the fax number is not registered in the address information 33 (S23: NO), in S21 the CPU 12 stores data for the fax job JOB2 in the NVRAM 15 for holding the fax job JOB2 and delaying printing based on the fax job JOB2.

Since fax numbers registered in the address information 33 may be numbers for the user's customers, acquaintances, and the like, the user will likely wish to confirm the printed matter of the fax job JOB2 as quickly as possible. Hence, it is preferable to print a fax job JOB2 from a registered fax number rather than delaying printing. However, fax numbers not registered in the address information 33 are likely numbers of companies or people with which the user has no acquaintance, such as an advertising company. Therefore, there is little need to print a fax job JOB2 having an unregistered fax number immediately. Accordingly, the CPU 12 delays printing of fax jobs JOB2 having fax numbers not registered in the address information 33.

Thus, in a case that the fax number is registered in the address information 33 (S23: YES), in S25 the CPU 12 determines whether the number of pages in the fax job JOB2 is less than or equal to the print hold page limit. Here, the CPU 12 reads the hold settings information 34 from the NVRAM 15 and acquires the print hold page limit from the hold settings information 34. In a case that the number of pages in the fax job JOB2 is less than or equal to the print hold page limit (S25: YES), in S21 the CPU 12 delays printing.

Here, even though printing is delayed for a job having few pages, the job can be printed quickly when a condition for executing the print is satisfied. Thus, in a case that a print command is received from the user to print a held print job, for example, printing can be completed quickly. That is, printing can be performed without requiring the user to wait for a long time next to the printer 1. Further, in a case that the power supply state will change so that a power level W being supplied decreases and sufficient power for printing is ensured, for example, printing of a job with few pages can be completed quickly during the reduced power level W being maintained. Note that the CPU 12 may determine to hold a fax job JOB2 under conditions other than the number of pages to print. For example, the CPU 12 may hold a fax job JOB2 when the time required for printing the fax job JOB2 is no greater than a prescribed time.

On the other hand, in a case that the number of pages in the print job is greater than the print hold page limit (S25: NO), in S27 the CPU 12 determines whether the total power required for printing the fax job JOB2 is greater than or equal to the power supply capacity. In a case that the total power required is less than the power supply capacity, i.e., in a case that a power shortage will not occur during printing even without limiting the power level W (S27: NO), in S15 the CPU 12 prints the fax job JOB2 received in S11.

However, in a case that the total required power is greater than or equal to the power supply capacity, i.e., in a case that that a power shortage will occur during printing (S27: YES), in S29 the CPU 12 limits the power level W being supplied and in S15 executes the print. For example, in S29 the CPU 12 conducts negotiation with the external device 61 to reduce the power level W by the lacking amount of power. Accordingly, the CPU 12 can print the fax job JOB2 received in S11 while the printer 1 is in a power supply state, in a case that NO determination is made in S19, YES determination is made in S23, and NO determination is made in S25. Further, in the process of S29 to limit the power level W, the CPU 12 may perform a process to halt the supply of the power level W rather than reducing the power level W. Further, after completing the print in S15, the CPU 12 may execute a process to return the power level W to the power level before it was limited.

Further, in a case that the CPU 12 determines in S17 that the print job received in S11 is not a fax job JOB2 (S17: NO), in S31 the CPU 12 determines whether the print job is an image-formation job JOB1 received by the communication interface 21. In a case that the print job received in S11 is the image-formation job JOB1 (S31: YES), the CPU 12 advances to S33.

In S33 the CPU 12 determines whether transmission source of the image-formation job JOB1 is located away from the printer 1 by a distance greater than or equal to a prescribed distance. For example, the CPU 12 determines whether the IP address of the PC 63 constituting the source of the image-formation job JOB1 belongs to the same network as the IP address of its own device set in the LAN interface of the communication interface 21. The CPU 12 may determine that the two IP addresses belong to the same network when the subnet (division of a network) of the IP address for its own device is equivalent to the subnet of the IP address for the transmission source based on the subnet mask set in the LAN interface of the communication interface 21, for example. While there are no particular restrictions on the method of detecting the IP address for the transmission source, the IP address of the source may be set in the image-formation job JOB1 or the CPU 12 may query the PC 63 that transmitted the job for the IP address, for example. In a case that the CPU 12 determines that the IP addresses do not belong on the same network, the CPU determines that transmission source of the image formation job JOB1 is located away from the printer 1 by the distance greater than or equal to the prescribed distance (S33: YES), and advances to S21 described above. In this way, the CPU 12 can delay printing of an image-formation job JOB1 received from a remote location, such as an image-formation job JOB1 of a user belonging to a separate department from the department to which the printer 1 belongs or an image-formation job JOB1 received from a building separate from the building in which the printer 1 is located. When a job is received from a remote device, it will likely take some time for the user that requested the print to retrieve the printed matter. By delaying the print, the CPU 12 can reduce the likelihood that the printed matter will be left unretrieved for a long period of time, thereby reducing the chance of the printed matter attracting the attention of other users.

However, in a case that the CPU 12 determines that its own IP address and the IP address for the source of the image-formation job JOB1 belong on the same network, NO determination is made in S33, and the CPU 12 advances to S34. While the process of S34 will be described later, a YES determination in S34 will result in the CPU 12 executing S27 described above. Accordingly, the CPU 12 can print an image-formation job JOB1 rather than delaying printing when the user of the image-formation job JOB1 is nearby and can likely retrieve the printed matter quickly, for example.

The method in S33 of determining whether the location of the transmission source is away from the printer 1 by the distance greater than or equal to the prescribed distance is not limited to a method using the subnet mask. For example, the CPU 12 may determine that the location of the source is away from the printer 1 by the distance greater than or equal to the prescribed distance based on whether its own IP address and the IP address of the source match or whether its own IP address and the IP address of the source match or whether a certain number of bits in the most-significant bit-group of its own IP address matches those in the IP address for the source (whether a number of bits in its own IP address matching bits in the IP address for the source from the most-significant bit is larger than or equal to the certain number of bits). Alternatively, the CPU 12 may determine that the location of the source is away from the printer 1 by the distance greater than or equal to the prescribed distance based on the difference between the numerical values in the network parts of the IP addresses. Further, the CPU 12 may determine that the location of the source is away from the printer 1 by the distance greater than or equal to the prescribed distance based on the host name of the PC 63 constituting the transmission source, the username set in the image-formation job JOB1, or the like. The CPU 12 may also request location information or information on the installation location from the printer driver on the source PC 63.

In S34 the CPU 12 determines whether the priority of the image-formation job JOB1 is higher than or equal to a prescribed priority. In the processes of S19, S23, S25, S33, and the like described above, the CPU 12 determines whether to delay printing based on information on the print job and the like. However, the user transmitting the image-formation job JOB1 may wish to set a priority based on the type of the image-formation job JOB1. For example, the user may increase the priority for image-formation jobs JOB1 of documents to be used immediately and reduce the priority for image-formation jobs JOB1 to be retrieved later when the user has free time. In S34 the CPU 12 determines whether to hold a print job by determining the priority set on the transmitting side for the image-formation job JOB1. Therefore, the prescribed priority used in the determination of S34 is set to determine whether the image-formation job JOB1 should be printed before other print jobs. The priority set for the image-formation job JOB1 is an example of the priority information.

In a case that the CPU 12 determines that the priority set for the image-formation job JOB1 is higher than or equal to the prescribed priority (S34: YES), the CPU 12 executes the process in S27 described above to print the image-formation job JOB1. However, in a case that the priority set for the image-formation job JOB1 is lower than the prescribed priority (S34: NO), in S21 the CPU 12 holds the image-formation job JOB1. In this way, the CPU 12 can determine image-formation jobs JOB1 that should be held based on their priorities.

There is no particular restriction on the method of setting the priority for image-formation jobs JOB1. For example, a priority setting for an image-formation JOB1 may be inputted through a print settings screen of the printer driver provided on the PC 63, and the CPU 12 mar receives the inputted print settings from the PC 63. Further, the print job provided with a priority is not limited to image-formation jobs JOB1. For example, the printer 1 may be configured to print file attachments in e-mails. In this case, the CPU 12 may determine whether to hold a print job received as an e-mail attachment based on the priority set in the e-mail (the X-Priority in the e-mail header, or the like). For example, the CPU 12 may print the print job when determining that the priority of the e-mail is "high" (S34: YES) and may hold the print job when determining that the priority is "medium" or "low" (S34: NO). In this case, the priority information in the e-mail is an example of the priority information.

The CPU 12 may also determine the priority of a fax job JOB2 and determine whether to delay printing based on this priority. For example, when the fax job is in an e-mail format, such as an iFax, the CPU 12 may determine to hold a fax job based on the priority set in the e-mail.

Further, in a case that the CPU 12 determines in S31 that the print job is not an image formation job (S31: NO), the CPU 12 advances directly to S27 to print the print job. Here, a PC connected to the printer 1 through the USB connector 19, i.e., a PC connected by only a USB cable (physical cable) (that is, directly connected by the USB cable) rather than through the wired network 62 or the like is more likely closer to the printer 1 than a PC 63 connected to the communication interface 21. In such cases, the user issuing the print command is more likely near the printer 1 and can retrieve the printed matter quickly. If a print job received via the USB connector 19 were to be held, the user would have to move to the printer 1 after transmitting the print job and perform an operation on the printer 1 to command the printing of the held print job, despite being near the printer 1, leading to a decline in usability. Therefore, when a print job is received from a device connected to the USB connector 19 (S31: NO), the CPU 12 can advance directly to S27 and print the print job rather than hold the print job since the print job was received from a device directly connected to the printer 1. Hence, this configuration can improve usability for users who are near the printer 1.

Similarly, in a case that a print job is received through the short-range wireless communication interface 22, the device or the user that transmitted the print job is likely close to the printer 1. Therefore, in a case that a print job is received through the short-range wireless communication interface 22, NO determination is made in S31, and the CPU 12 advances to S27. Thus, this configuration can also improve usability for users present within a range of the printer 1 close enough to be able to communicate through short-range wireless communication.

Further, in a case that the received print job is a direct print, NO determination is made in S31, in S27 the CPU 12 may simply print the job without delay. The direct print in this specification is a function by which the printer 1 reads print data from USB memory or other media connected to the USB connector 19 and prints the print data. In this case, the user who issued the command for a direct print (who connected the USB memory or the like) is likely near the printer 1. Therefore, this configuration can also improve usability by printing the print job in the direct print without delay.

Further, in a case that the CPU 12 receives a print job for a copy operation generated through operations inputted on the user interface 20, the CPU 12 may print the print job rather than hold the job (S31: NO, S27). In the case of a copy operation, the user must be next to the printer 1 in order to operate the user interface 20. Accordingly, usability can be improved by printing the copy without delay.

Note that a print job generated through operations inputted on the user interface 20 is not limited to the copy operation described above. For example, the printer 1 may be configured to receive a user ID and password on the user interface 20, conduct user authorization, and execute any print jobs associated with the logged-in user when authentication is successful. Thus, the CPU 12 may print rather than hold a print job presented upon successful user authentication (S31: NO, S27).

4. Process for Managing Held Print Jobs

Next, a process for managing held print jobs executed on the printer 1 of the embodiment will be described with reference to FIG. 4. The CPU 12 starts the process in FIG. 4 when the operating mode of the printer 1 is set to a mode that holds print jobs, such as the prioritize power delivery mode or the hybrid mode. By executing the process for managing held print jobs, the CPU 12 determines whether to execute a print based on a held print job. In the following description, a print job whose execution was delayed through the process of FIG. 3 or the like will be called a "held print job."

In S41 at the beginning of the process for managing held print jobs, the CPU 12 determines whether a print job is being held. For example, the CPU 12 determines whether data for a held print job is currently stored in the NVRAM 15. In a case that data for a held print job is not stored in the NVRAM 15 (S41: NO), the CPU 12 continues to repeat the determination process in S41. In a case that a held print job is stored in the NVRAM 15 (S41: YES), the CPU 12 advances to S43.

In S43 the CPU 12 determines whether the total power required for printing is greater than or equal to the power supply capacity. For example, in a case that a plurality of print jobs is being held and the total power required to print at least one of the print jobs is less than the power supply capacity (S43: NO), in S45 the CPU 12 prints all print jobs whose total required power is less than the power supply capacity. In other words, in S45 the CPU 12 prints those print jobs that can be printed without limiting the power level W. When a plurality of print jobs is being held, the CPU 12 prints the jobs sequentially in the order that they were held.

Thus, when a fax print job is temporarily held, for example, this method can minimize the hold time by printing the job when power sufficient for printing can be ensured. Even if sufficient power could not be secured at a time when the print job was received, for example, the printer 1 can execute the held print job if the power level W being supplied subsequently decreases, increasing the surplus power. After printing all print jobs that can be printed in S45, the CPU 12 deletes data for the printed jobs from the NVRAM 15 and ends the process of FIG. 4. Subsequently, the CPU 12 restarts the process from S41. In a case that the power level W increases or power supply resumes while executing the plurality of print jobs in S45, for example, the CPU 12 may interrupt the execution of print jobs and restart the process of FIG. 4 from S41.

On the other hand, when the total power required for each of the held print jobs is greater than or equal to the power supply capacity (S43: YES), in S47 the CPU 12 determines whether information on print jobs stored in the NVRAM 15 was updated. Here, information on print jobs is determined to have been updated in a case that the print jobs determined to be held in the NVRAM 15 when the process in S47 was previously executed differ from the print jobs currently held in the NVRAM 15. For example, when a new print job was held in the NVRAM 15, it is preferable to execute S59 described later to accept a print command for the new print job from the user. Therefore, in a case that information on print jobs in the NVRAM 15 was updated (S47: YES), the CPU 12 executes the process beginning from S53 to determine whether to print the held print job.

However, in a case that information on print jobs has not been updated (S47: NO), in S51 the CPU 12 determines whether a threshold time has elapsed since the process of S51 was previously executed. Here, it is preferable to perform the process from S53 periodically in order to determine whether or not to execute held print jobs, even when the information on print jobs in the NVRAM 15 remains unchanged. Therefore, each time the threshold time has elapsed (S51: YES), the CPU 12 executes the process from S53. Accordingly, the threshold time used in S51 is set to a desired time for periodically executing the process from S53. More specifically, the threshold time may be set to a few tens of minutes. In a case that the threshold time has not elapsed (S51: NO), the CPU 12 returns to S41 and repeats the process described above.

In S53 the CPU 12 determines whether the remaining capacity of the NVRAM 15 is less than or equal to a threshold capacity. When the residual capacity is insufficient, data in the NVRAM 15 is difficult to modify. That is, it is difficult to modify the hold settings information 34; to add address information 33, new print jobs (image-formation jobs JOB1 and fax jobs JOB2), or other information; and the like. As a result, the CPU 12 cannot suitably perform processes using the NVRAM 15. Accordingly, the threshold capacity used in S53 is the minimum residual capacity that must be maintained in the NVRAM 15.

In a case that the residual capacity is less than or equal to the threshold capacity (S53: YES), in S49 the CPU 12 limits the power level W and in S45 prints a held print job. In a case that YES determination is made in S43, the CPU 12 must limit the power level W to be supplied in order to execute the held print job. Thus, after limiting the power level W in S49, in S45 the CPU 12 prints the held print job. The CPU 12 may execute all held print jobs or may repeatedly execute one held print job and delete the print job from the NVRAM 15 until the residual capacity of the NVRAM 15 is greater than the threshold capacity. In the process of S49 for limiting the power level W, the CPU 12 may reduce the power level W just enough to gain sufficient power for printing or may stop supplying the external device with power altogether. After completing the print in S45, the CPU 12 may execute a process to restore the power level W to the level before it was limited.

However, in a case that the CPU 12 determines in S53 that the residual capacity of the NVRAM 15 is greater than the threshold capacity (S53: NO), in S55 the CPU 12 determines whether the current time is outside the print hold interval. Here, the CPU 12 reads the hold settings information 34 from the NVRAM 15 and extracts the print hold interval. In a case that the current time falls outside the time period specified by the acquired print hold interval (S55: YES), in S49 the CPU 12 limits the power level W and in S45 prints all held print jobs. Through this process, the CPU 12 can execute print jobs that were held during the print hold interval in the process of FIG. 3 described above. In a case that the process in S45 is executed after determining in S55 that the current time is outside the print hold interval, the CPU 12 may print only those print jobs that were held when a YES determination was reached in S19 of FIG. 3, i.e., only fax jobs JOB2 held during the print hold interval.

Figure 5:
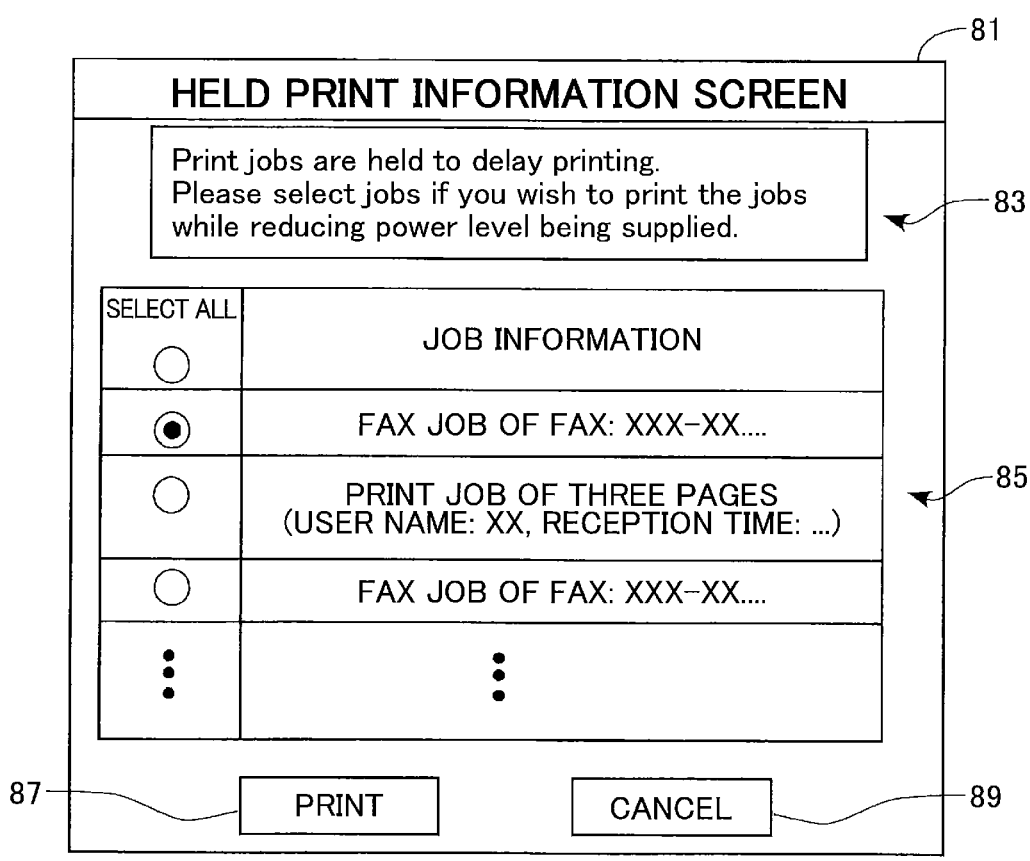
FIG. 5 is an explanatory diagram illustrating a held print information screen displayed on the user interface.

On the other hand, in a case that the current time is within the print hold interval (S55: NO), in S57 the CPU 12 displays a held print information screen 81 shown in FIG. 5 on the user interface 20 and in S59 determines whether a print command was received through the displayed screen 81. As shown in FIG. 5, the held print information screen 81 includes a message section 83, a job selection section 85, a Print button 87, and a Cancel button 89. The CPU 12 displays a message in the message section 83 prompting the user to confirm which if any of the print jobs to execute while limiting the power level W. The CPU 12 displays information for print jobs currently held in the NVRAM 15 as a list in the job selection section 85, and radio buttons therefor in the job selection section 85. The radio buttons are for enabling the user to individually select each print job that the user wishes to print among the held print jobs, or select a plurality of print jobs at a time which the user wishes to print all together among the held print jobs. In a case that the user touches the Print button 87 on the user interface 20 and the CPU 12 receives the input operation via the user interface 20, YES determination is made in S59, and in S49 the CPU 12 limits the power level W and in S45 prints one or a plurality of print jobs that were selected in the job selection section 85. With this configuration, the CPU 12 can receive selections from the user for print jobs to be printed and can execute a print based on those print jobs.

In a case that the user touches the Cancel button 89 on the user interface 20 and the CPU 12 receives the input operation via the user interface 20 (S59: NO), in S61 the CPU 12 removes the display of the held print information screen 81 from the user interface 20. Subsequently, the CPU 12 re-executes the process in FIG. 4 from S41. Through this process, the CPU 12 can execute held print jobs based on prescribed conditions.

Note that in a case a prescribed time elapses without receiving the input operation via the user interface 20 after the CPU 12 has displayed the held print information screen 81 on the user interface 20, the CPU 12 may reach a negative determination in S59 and execute the process in S61. Further, the CPU 12 need not actively display the held print information screen 81. For example, the CPU 12 may display the held print information screen 81 on the user interface 20 after a prescribed input operation is received on the user interface 20 and may subsequently accept a print command. In a case that the CPU 12 displays the held print information screen 81 upon receipt of the prescribed operation via the user interface and NO determination is made in S55, the CPU 12 may execute the process of S59 to determine whether a print command was received in the held print information screen 81, and may execute a print command received in the user interface 20 prior to the process of S59. In this case, the CPU 12 need not execute the display process in S57. Alternatively, the CPU 12 may execute both the active display process in S57 and the reception process for receiving an operation related to the display through the user interface 20.

The printer 1 is an example of the printing device. The CPU 12 is an example of the controller. The NVRAM 15 is an example of a storage. The USB connector 19 is an example of the interface. The processes of S17, S19, S23, S25, S31, S33, and S34 are examples of the determination process and the determination step. The conditions used in determinations of S17, S19, S23, S25, S31, S33, and S34 are examples of the first condition and the second condition. The process of S15 is an example of the printing process and the printing step. The process of S21 is an example of the holding process and the holding step. The process of S43 is an example of the power level determination process. The process of S59 is an example of the command determination process. The process of S55 is an example of the time zone determination process. The process of S53 is an example of the remaining capacity determination process.

5. Effects of the Embodiment

The embodiment described above obtains the following effects.

(1) In a case that the CPU 12 in the printer 1 according to the embodiment receives a print job instructing a print using the printing unit 16 while the printer 1 is currently supplying power at a prescribed power level W to the external device 61 via the USB connector 19, the CPU 12 determines whether prescribed conditions are met and based on the results of those determinations determines whether to delay printing of the print job. For example, in a case that the print job is neither an image-formation job JOB1 nor a fax job JOB2 (S17: NO, S31: NO), the CPU 12 limits the power level W (S29) and executes a print of the print job using the printing unit 16 (S15). However, in a case that the print job is a fax job JOB2 (S17: YES), the CPU 12 delays printing without limiting the power level W (S21).

Thus, when the printer 1 receives the print job while delivering power, the printer 1 determines whether the prescribed conditions are met without immediately limiting the power level W. The printer 1 limits the power level W and prints the print job when the print job is not an image-formation job JOB1 or a fax job JOB2, for example. In this way, the printer 1 can execute print jobs that must be printed immediately when prescribed conditions are satisfied.

On the other hand, the printer 1 delays printing without limiting the power level W being supplied to the external device 61 when the print job is a fax job JOB2, for example. In this way, the printer 1 can delay printing until a timing at which the print job can be executed while maintaining the current power level W, such as when surplus power for the printer 1 has increased or when the power required by the external device 61 has decreased to enable the power level W to be decreased. Accordingly, the printer 1 can avoid the occurrence of a power shortage in the external device 61.

(2) Further, the CPU 12 delays printing when the print job is a fax job JOB2 received via the fax communication interface 23 (S17: YES). Since a fax job JOB2 is transmitted at the convenience of the transmitter, the recipient is unlikely to be waiting next to the printer 1 to receive the fax job JOB2. In other words, even if a fax job JOB2 is temporarily held before printing, the user is not likely to feel that printing was delayed. Hence, when a received print job is a fax job JOB2, the printer 1 can avoid a decline in usability and avoid the occurrence of a power shortage on the external device 61 by temporarily holding the fax job JOB2.

(3) Further, the CPU 12 acquires information about the print hold interval from the hold settings information 34 indicating the time period in which printing is to be delayed. In a case that the current time falls within the time period indicated by the print hold interval, the CPU 12 hold the print job to delay printing (S21). Thus, when the user sets the print hold interval to a time period in which the user does not check fax receptions, the printer 1 can prioritize power supply over printing and avoid the occurrence of power shortages on the external device 61 within a time period in which the contents of faxes are not immediately checked.

(4) Further, in a case that the fax number for the transmission source (an example of the transmission source information) set in a fax job JOB2 is not registered in the address information 33 (S23: NO), the CPU 12 delays printing. Since the transmission source of a fax job JOB2 is likely unknown to the user when the fax number for the fax job JOB2 is not registered in the address information 33, it is unlikely that the fax job JOB2 will need to be printed right away. Therefore, the printer 1 can avoid power shortages in the external device 61 by holding fax jobs JOB2 from fax numbers not registered in the address information 33.

(5) The CPU 12 also delays the printing of a fax job JOB2 when the number of pages to be printed according to the fax job JOB2 is less than or equal to the print hold page limit (an example of the threshold page number in the present disclosure; S25: YES). Since a fax job JOB2 having few pages to be printed can be printed in a relatively short amount of time, the user need wait only a short amount of time before receiving the printed matter, even if the fax job JOB2 is temporarily held and subsequently printed upon receiving a print command from the user.

(6) The CPU 12 also delays printing of an image-formation job JOB1 when determining based on the transmission source information for the image-formation job JOB1 that the distance between the location of the source device of the job and the printer 1 is greater than or equal to a prescribed distance (S33: YES). When the transmission source of the image-formation job JOB1 is physically separated from the printer 1, the user transmitting the image-formation job JOB1 will need a significant amount of time to reach the printer 1 after transmitting the job. In other words, even while temporarily holding the image-formation job JOB1 and thereafter the printing is performed for the image-formation job JOB1, the actual waiting time by the user can be short while a power shortage on the external device 61 can be avoided.

(7) After holding a print job, the CPU 12 determines whether the total power required for printing based on the held print job is greater than or equal to the power supply capacity of the power supply unit 27 (S43). In a case that the CPU 12 determines that the total required power is less than the power supply capacity (S43: NO), the CPU 12 prints the held print job (S45).

Since there is no need to limit the power level W to be supplied during printing and no need to delay execution of printing when the total power required is less than the power supply capacity, the printer 1 can prevent the hold time from becoming unnecessarily long by executing held print jobs when the required power supply is less than the power supply capacity.

(8) After printing has been delayed, the CPU 12 determines whether a command to begin executing held print job(s) was received through the user interface 20 (S59). In a case that a command to begin printing was received (S59: YES), the CPU 12 prints held print job(s) (S45). Accordingly, in a case that the user wishes to print held print jobs after their printing has been temporarily delayed, even if it means limiting the power level W, the user can issue a command via the user interface 20. Alternatively, the user can issue a print command after taking some action such as stopping or disconnecting the external device 61.

(9) Further, after delaying the execution of print jobs, the CPU 12 acquires information on the print hold interval from the hold settings information 34 and determines whether the current time falls outside the print hold interval (S55). In a case that the current time falls outside the print hold interval (S55: YES), the CPU 12 prints held print jobs. With this configuration, the printer 1 can quickly execute print jobs, which were held during the time period specified by the prescribed print hold interval, after the time period has passed. For example, the printer 1 can print fax jobs JOB2 that were held during a nighttime interval so that the printed matter is ready when the user arrives at the office.

(10) Further, after delaying the execution of print jobs, the CPU 12 determines whether the free capacity of the NVRAM 15 is less than or equal to a prescribed threshold capacity (S53). In a case that the available capacity of the NVRAM 15 is less than or equal to the prescribed threshold capacity (S53: YES), the CPU 12 reads data related to the print job from the NVRAM 15, prints the print job, and deletes the data from the NVRAM 15.

That is, the available capacity of the NVRAM 15 may become insufficient as the number of held print jobs increases. Therefore, the printer 1 can prevent the NVRAM 15 from running out of free memory by printing held print jobs and deleting the jobs from the NVRAM 15 before the available capacity becomes insufficient.

(11) In a case that the CPU 12 receives a print job via the short-range wireless communication interface 22 (S31: NO), the CPU 12 may print the print job directly. Thus, when the user that issued a print command is near the printer 1, the printer 1 can avoid making the user wait for printing by executing rather than holding the print job.

(12) The CPU 12 may print a print job when any of the following conditions is satisfied (S31: NO): the print job is received from a device connected to the USB connector 19 through only a USB cable, the print job is a job executed by reading print data stored in USB memory connected to the USB connector 19 (a direct print job), or the print job was generated through a copy operation or the like on the user interface 20. When any of the conditions described above is met, the user issuing the print command is most likely next to the printer 1. Therefore, the printer 1 can avoid making the user wait for printing by executing rather than holding the print job.

(13) The printer 1 is provided with the prioritize power delivery mode, the hybrid mode, and the prioritize printing mode (see FIG. 2). In the prioritize power delivery mode, the CPU 12 does not execute the processes for determining conditions but holds all print jobs received without limiting the power level W. In the hybrid mode (an example of the print hold mode in the present disclosure), the CPU 12 executes the determination processes described in the embodiment to determine whether conditions are met. In the prioritize printing mode, the CPU 12 does not execute the determination processes for conditions but limits the power level W and executes printing for all print jobs received. Accordingly, the modes of the printer 1 can be changed in order to prioritize the power delivery, to prioritize printing, or to achieve a balance between power delivery and printing.

(14) Priority information may be set for a print job to indicate the priority of that print job relative to other print jobs. In this case, when the priority indicated by priority information set in a print job is higher than or equal to a prescribed priority (S34: YES), the CPU 12 may print the print job without delay. Thus, the user can selectively indicate whether to select or hold a print job by setting a priority for that print job.

6. Variations of the Embodiment

While the disclosure has been described in detail with reference to the specific embodiment thereof, it would be apparent to those skilled in the art that various changes and modifications may be made therein without departing from the scope of the invention.

Figure 4:
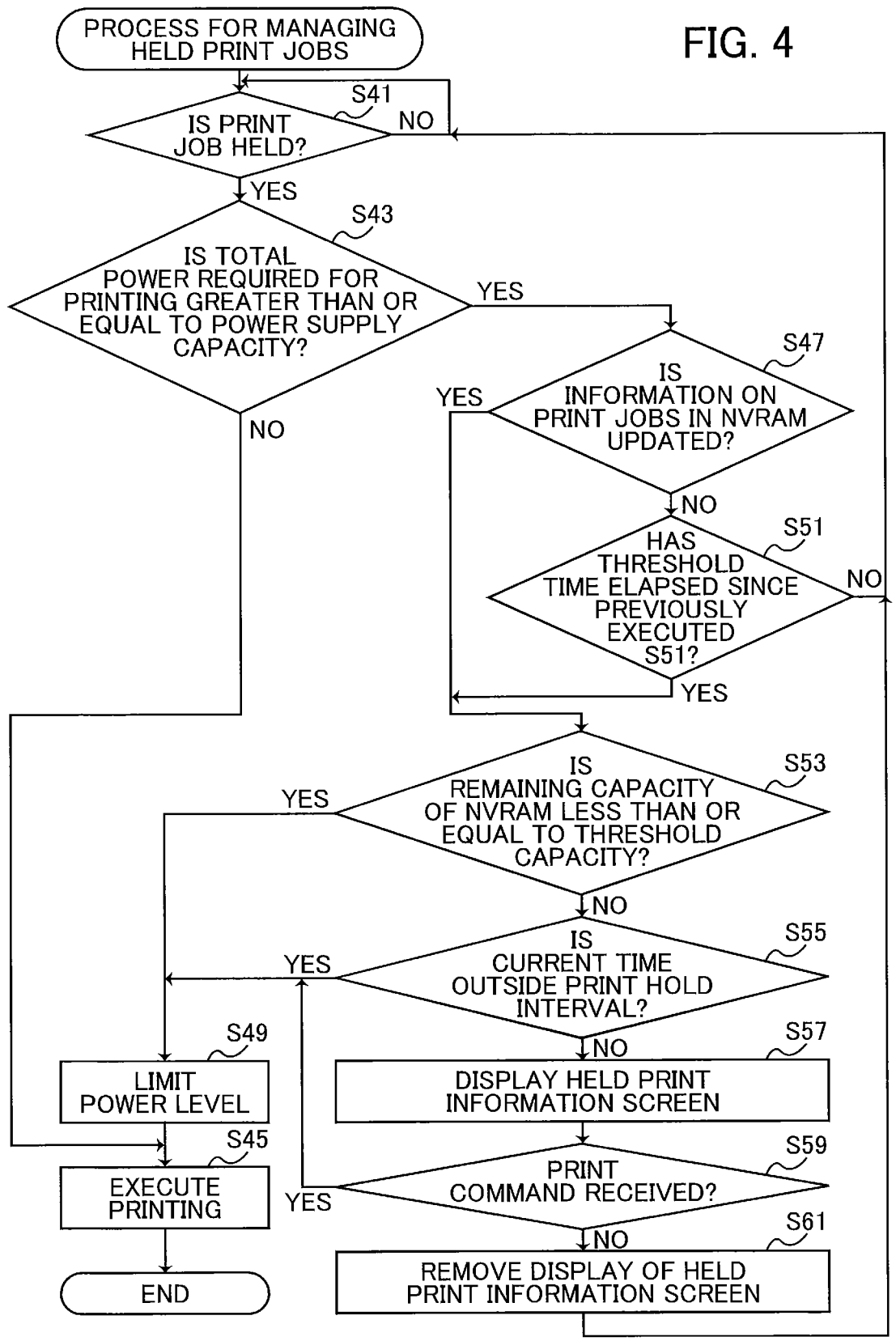
FIG. 4 is a flowchart illustrating a process for managing held print jobs.

The content, the order, and the like of processes in the flowcharts shown in FIGS. 3 and 4 described above are merely an example. For example, in S13 of FIG. 3, the CPU 12 may determine whether the total power required for printing is greater than or equal to the power supply capacity, as described in S27. In this case, the CPU 12 may execute S15 when the total required power is less than the power supply capacity and may execute S17 when the total required power is greater than or equal to the power supply capacity. That is, the CPU 12 may print rather than hold a print job whose printing does not require limiting the power level W. However, the process shown in FIG. 3 is advantageous in that the CPU 12 can determine in S13 whether the printer 1 is supplying the power level W and proceed quickly to S17 when true, without having to calculate the total required power. On the other hand, the CPU 12 must calculate the total required power for the determination process in S43 of FIG. 4. In a case that the total required power has already been determined at the timing of S13, this determination may be omitted from the process of FIG. 4. In this case, the process of S27 in FIG. 3 may be omitted in addition to the process of S43.

The CPU 12 may also execute the determination process executed in S19 related to the print hold interval and the determination process executed in S25 related to the print hold page limit for image-formation jobs JOB1, as well as fax jobs. For example, the CPU 12 may execute the process of S21 to hold an image-formation job JOB1 when the number of pages to be printed in the image-formation job JOB1 is less than or equal to the prescribed print hold page limit. In this case, the CPU 12 may receive one prescribed print hold page limit for both image-formation jobs JOB1 and fax jobs JOB2, or may receive separate prescribed print hold page limits for image-formation jobs JOB1 and fax jobs JOB2. Similarly, the CPU 12 may receive one specified time period as the print hold interval for both image-formation jobs JOB1 and fax jobs JOB2 or may receive separate time periods for image-formation jobs JOB1 and fax jobs JOB2.

Further, while the CPU 12 executes the processes in FIGS. 3 and 4 to determine whether or not to delay printing for various types of print jobs, the CPU 12 may instead execute the processes in FIGS. 3 and 4 while targeting only image-formation jobs JOB1 and fax jobs JOB2, for example. In this case, the process of S31 may be omitted.

The CPU 12 also need not execute the process of S33 to determine the location of the transmission source or the process of S34 to determine the priority. In a case that the process of S33 is not executed, the process of S34 may be executed after YES determination is made in S31. In a case that the process of S34 is not executed, the process of S27 may be executed after NO determination is made in S33. In a case that neither the process of S33 nor the process of S34 is executed, the process of S21 may be executed after YES determination is made in S31. Conversely, the CPU 12 may execute only the process of S33 to determine the location of the transmission source or only the process of S34 to determine priority, while not executing the determination processes in S17 or S31. In this case, the process of S33 or S34 is executed after YES determination is made in S13.

Further, the CPU 12 may be configured to execute a process to print any image-formation jobs JOB1 and to delay the printing of any fax jobs JOB2, for example. Further, the CPU 12 may be configured to execute at least one of the determination processes of S19, S23, and 25, for example. Further, the CPU 12 may be configured to execute at least one of the processes in S53, S55, and S59. Further, the printer 1 may be provided with only the hybrid mode.

While the CPU 12 executes the processes in FIGS. 3 and 4 in the embodiment, these processes may be executed by another device. For example, the power controller 25 may implement the processes in FIGS. 3 and 4 by executing the program PG stored in the memory 26. In this case, the power controller 25 is an example of the controller, and the program PG is an example of the program.

The concept of limiting power in the present specification includes not just an operation for reducing power, but also an operation for setting the power level to zero (halting the supply of power).

The communication standard of the interface is not limited to the USB PD specification, and other communication standard capable of deliver or accept power. That is, the interface of the present disclosure is not limited to the USB interface.

In the embodiment, the CPU 12 is used as the controller but the controller is not limited to this. For example, at least part of the controller may be achieved by dedicated hardware such as ASIC (Application Specific Integrated Circuit). The controller may be operated by the combination of software processing and hardware processing.

The power supply unit 27 may not be provided with the battery 31.

In the embodiment, the portable printer 1 is employed as an example of the printing device, but the printing device is not limited to this. For example, the printing device may be a stationary type printer, or other devices such as a copier machine, a facsimile machine, and a scanner machine. The printing device may be a multifunction peripheral having the plurality of functions such as the printing function, the scanner function, and the copy function.

Further, the flowcharts in FIGS. 3 and 4. do not limit the present invention to the steps indicated therein. Steps may be added or deleted, or their order may be rearranged.

What is claimed is:

1. A printing device comprising:
    a printing unit configured to perform printing, the printing unit including a print engine;
    an interface; and
    a controller configured to perform:
        in a case that a print job is received while electric power is being supplied to an external device from the interface, determining whether a first condition or a second condition is met, the print job being for commanding the printing unit to execute printing, the second condition being different from the first condition;
        executing printing based on the print job while limiting a level of the electric power being supplied to the external device from the interface in a case that the controller determines that the first condition is met; and
        holding the print job without limiting a level of the electric power supplied to the external device from the interface in a case that the controller determines that the second condition is met.

2. The printing device according to claim 1, further comprising a facsimile communication interface configured to receive a facsimile job including facsimile data,
    wherein the controller determines that the second condition is met in a case that the received print job is the facsimile job.

3. The printing device according to claim 1, further comprising a facsimile communication interface configured to receive a facsimile job including facsimile data,
    wherein the controller is configured to further perform:
        acquiring a print hold time interval indicating a time period in which the print job is held to delay printing based on the print job,
    wherein the controller determines that the second condition is met in a case that the print job is the facsimile job and a current time is within the acquired print hold time interval.

4. The printing device according to claim 1, further comprising:
    a facsimile communication interface configured to receive and transmit a facsimile job including facsimile data; and
    a storage storing address information registering transmission destination information to which a facsimile job is to be transmitted via the facsimile communication interface,
    wherein the controller determines that the second condition is met in a case that a transmission source of the facsimile job is not registered in the address information as a transmission destination.

5. The printing device according to claim 1, further comprising a facsimile communication interface configured to receive a facsimile job including facsimile data,
    wherein the controller determines that the second condition is met in a case that number of pages to be printed according to the facsimile job is smaller than or equal to a prescribed page number.

6. The printing device according to claim 1, wherein the controller is configured to further perform:
    determining based on transmission source information of the print job whether a distance between the printing device and a device which transmits the print job is larger than or equal to a prescribed distance,
    wherein the controller determines that the second condition is met in a case that the distance is larger than or equal to the prescribed distance.

7. The printing device according to claim 1, further comprising a power supply unit to supply the printing unit with electric power, the power supply unit having an available power supply capacity to which the printing device can supply the power,
    wherein the controller is configured to further perform:
        after the print job is held, determining whether an electric power required for executing the printing based on the held print job is greater than or equal to the available power supply capacity; and
        executing printing based on the held print job after the controller determines that the electric power required for executing the printing based on the held print job is less than the available power supply capacity.

8. The printing device according to claim 1, further comprising a user interface,
    wherein the controller is configured to further perform:
        after the print job is held, determining whether a command to execute printing based on the held print job is received via the user interface; and
        executing printing based on the held print job after the controller determines that the command to execute printing based on the held print job is received via the user interface.

9. The printing device according to claim 1, wherein the controller is configured to further perform:
    after the print job is held, acquiring a print hold time interval indicating a time period in which the print job is held to delay printing based on the print job, and determining whether a current time is outside the acquired print hold time interval; and
    executing printing based on the held print job after the controller determines that the current time is outside the acquired print hold time interval.

10. The printing device according to claim 1, further comprising a storage configured to store data related to the held print job,
    wherein the controller is configured to further perform:
        after the print job is held, determining whether a remaining capacity of the storage is less than or equal to a prescribed threshold capacity; and
        reading the data related to the held print job, executing printing based on the read data, and deleting the read data from the storage, wherein the reading, the executing, and the deleting is performed after the controller determines that the remaining capacity of the storage is less than or equal to a prescribed threshold capacity.

11. The printing device according to claim 1, further comprising a short-range wireless communication interface, wherein the controller determines that the first condition is met in a case that the print job is received via the short-range wireless communication interface.

12. The printing device according to claim 1, wherein the controller determines that the first condition is met in a case that at least one of following conditions is met: a condition that the print job is received from a device which is connected through only a physical cable; a condition that the print job is received by reading from an external memory connected to the interface; and a condition that the print job is received via a user interface provided in the printing device.

13. The printing device according to claim 1, wherein the controller is configured to selectively execute a prioritize power delivery mode, a print hold mode, and a prioritize printing mode,
wherein in the prioritize power delivery mode, the controller does not execute the determining whether a first condition or a second condition is met and holds all received print jobs to delay printing based on the received print jobs using the printing unit without limiting the level of the electric power supplied to the external device from the interface,
wherein in the print hold mode, the controller executes the determining whether a first condition or a second condition is met,
wherein in the prioritize printing mode, the controller does not execute the determining whether a first condition or a second condition is met and executes printing based on all received print jobs while limiting the level of the electric power supplied to the external device from the interface.

14. The printing device according to claim 1, wherein priority information is set for the print job, the priority information indicating a priority level which is to be compared with a priority level of another print job,
wherein the controller determines that the first condition is met in a case that the priority level set for the received print job is higher than or equal to a prescribed priority level.

15. A method for controlling a printing device including: a printing unit configured to perform printing, the printing unit including a print engine; an interface; and a controller, the method comprising:
in a case that a print job is received while electric power is being supplied to an external device from the interface, determining whether a first condition or a second condition is met, the print job being for commanding the printing unit to execute printing, the second condition being different from the first condition;
executing printing based on the print job while limiting a level of the electric power being supplied to the external device from the interface in a case that it is determined that the first condition is met; and
holding the print job without limiting a level of the electric power supplied to the external device from the interface in a case that it is determined that the second condition is met.

16. A non-transitory computer readable storage medium storing a set of program instructions installed on and executed by a computer for controlling a printing device including: a printing unit configured to perform printing, the printing unit including a print engine; and an interface, the set of program instructions comprising:
in a case that a print job is received while electric power is being supplied to an external device from the interface, determining whether a first condition or a second condition is met, the print job being for commanding the printing unit to execute printing, the second condition being different from the first condition;
executing printing based on the print job while limiting a level of the electric power being supplied to the external device from the interface in a case that it is determined that the first condition is met; and
holding the print job without limiting a level of the electric power supplied to the external device from the interface in a case that it is determined that the second condition is met.

17. The non-transitory computer readable storage medium according to claim 16, wherein the printing device further includes a facsimile communication interface configured to receive a facsimile job including facsimile data,
wherein it is determined that the second condition is met in a case that the received print job is the facsimile job.

18. The non-transitory computer readable storage medium according to claim 16, wherein the printing device further includes a facsimile communication interface configured to receive a facsimile job including facsimile data,
the set of program instructions further comprising:
acquiring a print hold time interval indicating a time period in which the print job is held to delay printing based on the print job,
wherein it is determined that the second condition is met in a case that the print job is the facsimile job and a current time is within the acquired print hold time interval.

19. The non-transitory computer readable storage medium according to claim 16, wherein the printing device further includes: a facsimile communication interface configured to receive and transmit a facsimile job including facsimile data; and a storage storing address information registering transmission destination information to which a facsimile job is to be transmitted via the facsimile communication interface,
wherein it is determined that the second condition is met in a case that a transmission source of the facsimile job is not registered in the address information as a transmission destination.

20. The non-transitory computer readable storage medium according to claim 16, wherein the printing device further includes a facsimile communication interface configured to receive a facsimile job including facsimile data,
wherein it is determined that the second condition is met in a case that number of pages to be printed according to the facsimile job is smaller than or equal to a prescribed page number.

* * * * *